(12) United States Patent
Nogawa (10) Patent No.: US 9,071,706 B2
(45) Date of Patent: Jun. 30, 2015

(54) IMAGE READING DEVICE AND IMAGE READING-TRANSMITTING METHOD

(75) Inventor: Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 994 days.

(21) Appl. No.: 12/198,440

(22) Filed: Aug. 26, 2008

(65) Prior Publication Data

US 2009/0060392 A1    Mar. 5, 2009

(30) Foreign Application Priority Data

Aug. 29, 2007  (JP) ................................ 2007-222284

(51) Int. Cl.
*H04N 1/00* (2006.01)
*H04N 1/44* (2006.01)

(52) U.S. Cl.
CPC ....... *H04N 1/00204* (2013.01); *H04N 1/00413* (2013.01); *H04N 1/00795* (2013.01); *H04N 1/4413* (2013.01); *H04N 1/4433* (2013.01); *H04N 2201/0039* (2013.01); *H04N 2201/0081* (2013.01)

(58) Field of Classification Search
USPC ........................................................ 358/1.15
See application file for complete search history.

(56) References Cited

U.S. PATENT DOCUMENTS

2003/0184782 A1* 10/2003 Perkins et al. ............... 358/1.13
2004/0249690 A1* 12/2004 Fuse et al. ......................... 705/7
2005/0286080 A1* 12/2005 Lee et al. .................... 358/1.15
2006/0173996 A1* 8/2006 Bates et al. .................... 709/224
2006/0271675 A1   11/2006 Wakazono et al.
2007/0297002 A1* 12/2007 Hase et al. ................... 358/1.15

FOREIGN PATENT DOCUMENTS

| JP | 09-204515 A | 8/1997 |
| JP | 2001-148753 A | 5/2001 |
| JP | 2003-348278 | 12/2003 |
| JP | 2004-274203 A | 9/2004 |
| JP | 2006-140970 | 6/2006 |
| JP | 2006-339904 A | 12/2006 |

OTHER PUBLICATIONS

JP Office Action dated Jul. 19, 2011, corresponding JP Application No. 2007-222284; English Translation.

* cited by examiner

*Primary Examiner* — Ashish K Thomas
*Assistant Examiner* — Keara Harris
(74) *Attorney, Agent, or Firm* — Banner & Witcoff, Ltd.

(57) ABSTRACT

An image reading device allows an image transmission destination terminal to be designated from a console. The communication unit of the image reading device receives verification data from terminals via a network. The storage unit stores each of the received verification data in association with the terminal which had transmitted the verification data. The user inputs authentication data to the console after setting the document in place. When the authentication data is input, a list of terminals associated with the verification data matching the authentication data is displayed. The user may select from the displayed list, via the console, the transmission destination terminal to which the image is to be transmitted. When the user selects the transmission destination terminal, the reading control unit reads out an image and transmits the image to the selected terminal. The number of terminals displayed as candidates for the image transmission destination can be limited.

3 Claims, 5 Drawing Sheets

| JOB ID | VERIFICATION DATA | TERMINAL NAME | IP ADDRESS |
|---|---|---|---|
| 001 | aaa | PC-1 | www. xxx. yyy. zz1 |
| 002 | bbb | PC-2 | www. xxx. yyy. zz2 |
| 003 | aaa | PC-3 | www. xxx. yyy. zz3 |
| 004 | ccc | PC-1 | www. xxx. yyy. zz1 |
| ⋮ | ⋮ | ⋮ | ⋮ |

IMAGE READING DEVICE AND IMAGE READING-TRANSMITTING METHOD

CROSS-REFERENCE TO RELATED APPLICATION

The present application claims priority to Japanese Patent Application No. 2007-222284, filed on Aug. 29, 2007, the contents of which are herein incorporated by reference into the present application.

BACKGROUND OF THE INVENTION

1. Field of the Invention

The present invention relates to an image reading device that reads out an image from a document and transmits the read image to a terminal via a network, an image reading-transmitting program and method to transmit the read image to the terminal via the network, and an image reading system.

2. Description of the Related Art

An image reading device connected to a network that transmits an image read out from a document to a terminal via the network is known. For example, Japanese Patent Application Publication No. 2003-348278 discloses such an image reading device.

Two types of methods for controlling this kind of image reading device may exist. One method is a type of method in which the image reading device is controlled by a terminal via a network. This type of method is sometimes referred to as the 'pull scan' system. The other type of method is a type of method whereby the user controls the image reading device by operating a console provided in the image reading device. This type of method is sometimes referred to as the 'push scan' system. With the pull scan system, because control commands are sent from the terminal to the image reading device, the terminal that have transmitted the control command may be referred to as a destination terminal of the image data transmission. The "destination terminal of the image data transmission" may hereinafter be simply referred to as "destination terminal". With the push scan system, the user must designate a destination terminal of the image data from the console provided on the image reading device.

BRIEF SUMMARY OF THE INVENTION

With the pull scan system, the user must set the document in place in the image reading device and then return to the terminal, and must operate the terminal in order to transmit a command to start image reading to the image reading device. Hence, there may be a risk and disadvantage rising therefrom that another person may remove or change the document by mistake during the period from the time when the user sets the document in place until the time when the user moves to and operates the terminal to transmit the command.

With the push scan system, the user must designate the destination terminal of the image data among the terminals connected to the network. However, when a large number of terminals are connected to the network, the burden on the user for searching and designating the desired destination terminal increases. For example, the process of designating the desired terminal among many terminals connected to the network is troublesome for the user. Furthermore, there may be a risk in which the wrong terminal is designated as the destination terminal. The present application discloses a technology capable of transmitting a desired document-based image that has been read by the image reading device to the desired destination terminal.

The present application discloses an image reading device that transmits an image being read from a document to a terminal via a network. The image reading device comprises a reader unit, a receiver, a storage, a first operating unit, a second operating unit, a verifying module, and a transmitter. The first operating unit and second operating unit are directly operated by the user.

The receiver receives verification data from a terminal via the network. The storage stores the received verification data in a manner that the received verification data is associated with the terminal which had transmitted the verification data. The first operating unit is an operating unit to which authentication data is input by the user. The verifying module specifies (extracts) one or more terminals which are associated with the stored verification data that matches the input authentication data. The verifying module also displays a list of the one or more specified (extracted) terminals. The user operates the second operating unit to select, from the displayed terminal list, at least one destination terminal of read image data. When the destination terminal is selected by the user, the reader unit reads out an image from a document. Then, the transmitter transmits the read image to the at least one selected terminal (i.e., the at least one selected destination terminal). The operating unit may be referred to as the 'console'. One operation unit (console) may function as both of the first operating unit and the second operating unit. Alternatively, the first operating unit may be different from the second operating unit.

The image reading device receives verification data from the terminal before the user operates the consoles. The user inputs authentication data to the first console (i.e., the first operating unit) after setting the document in place in the image reading device. In inputting the authentication data, the user may input what is described intact by the verification data that has been transmitted by the terminal to which the user desires to transmit the read image. At this point, the user may not designate the destination terminal of the read image data, but instead, may simply input the authentication data.

When the authentication data is input to the first console, a list of one or more terminals associated with the verification data that matches the input authentication data is displayed. The user may use the second console (the second operating unit) to select, from among the displayed list, the destination terminal to which the image is to be transmitted.

A display of the image reading device displays the list of the one or more terminals which had transmitted the verification data that matches the authentication data input by the user. Under the aforementioned condition, the display does not display all of the terminals connected to the network. That is, the number of terminals displayed as candidates for the destination terminal can be limited. The user is therefore able to easily select (designate) the destination terminal. In other words, even in cases where the image reading device has a small display and many terminals cannot be displayed at the same time, the user may select (designate) the desired destination terminal without scrolling the list on the display.

Once the destination terminals are selected by the user, the image reading device starts to read the image. Unlike the case with the pull scan system, there is no need to instruct that reading be started after setting the document in place and then returning to the terminal in the present invention. Hence, there is no risk of the document being removed or changed during the interval from the point where the document is set in place to the start of the image reading.

The technology disclosed in the present application is capable of transmitting the image read out to the desired terminal via a network.

DETAILED DESCRIPTION OF THE PREFERRED EMBODIMENT

Figure 1:
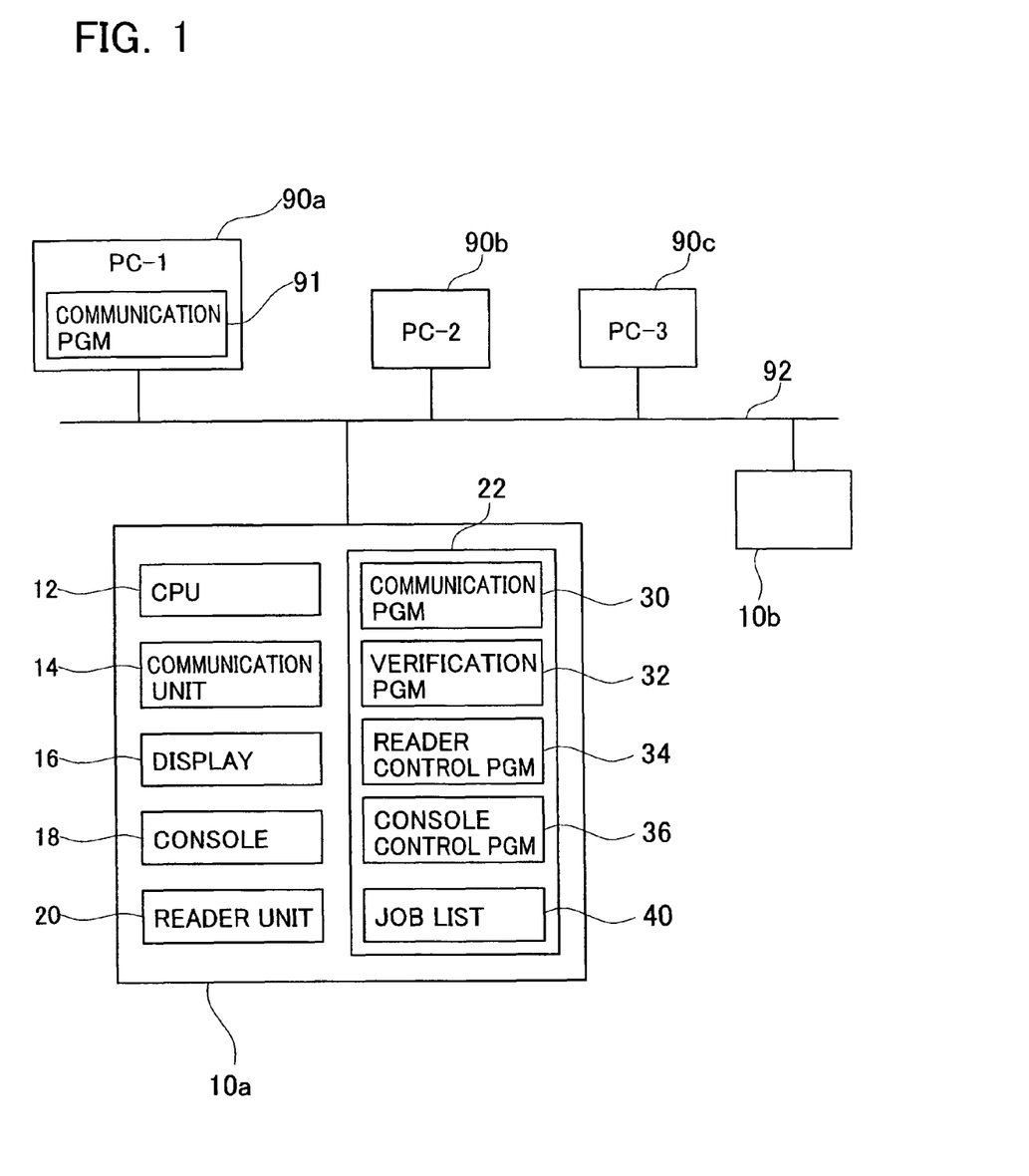
FIG. 1 shows a block diagram of an image reading device.

An embodiment of the teachings of the present application will now be described with reference to the drawings. FIG. 1 shows a block diagram of a scanner 10a. The scanner 10a is one of the embodiments of the image reading device of the present teachings. Scanner 10a is connected to a network 92. FIG. 1 also shows another scanner 10b that is connected to the network 92 and three terminals 90a, 90b, and 90c. Terminals 90a, 90b, and 90c may hereinafter be referred to as PC-1, PC-2, and PC-3 respectively. Scanner 10b possesses the same functions as scanner 10a, and the description of scanner 10b will therefore be omitted.

An overview of scanner 10a will now be provided. Scanner 10a is able to read an image from a document set in place by the user and transmit the read image to a terminal that is designated by the user. In a case where the user designates two or more terminals, the scanner 10a is able to transmit the image to each of the designated terminals. The user operates one of the any terminals (terminal 90a, for example) in advance to the transmission of the read out image. Specifically, the user may operate one of the terminals to transmit verification data together with a reservation command from the terminal to scanner 10a. The reservation command is a command for registering the terminal that transmits the command to scanner 10a as a candidate for the destination terminal for transmitting image data. The verification data may be a random symbol string which the user inputs to the terminal. The verification data corresponds to a so-called ID or password. The terminal screen displays the scanners (scanners 10a and 10b) available via the network, and the user therefore can select the desired scanner (scanner 10a in the case of this embodiment) to transmit the verification data. Scanner 10a is connected to the network 92 and is therefore capable of receiving a plurality of verification data, may it be at the same time or consecutively, from a plurality of terminals that are connected to the network 92.

The user may approach scanner 10a, and set a document in place after transmitting verification data from the terminal (terminal 90a, for example). The user then inputs authentication data through the console 18 of scanner 10a. Authentication data may be the same data as the verification data previously transmitted from the terminal.

When authentication data is input, scanner 10a searches for verification data that matches the input authentication data among the previously received verification data. In cases where verification data matching the authentication data is found, scanner 10a displays a list of the terminals which had transmitted the verification data on display 16. That is, scanner 10a (specifies) one or more terminals which are associated with the verification data matching the input authentication data. Then, the scanner 10a displays a list of terminals that have been extracted (specified). As a result, a plurality of terminals may be displayed on the scanner 10a. It should be noted that, in a case where only one terminal corresponds to the verification data that matches with the input authentication data, the "list of terminals" may be constituted of that one terminal.

The user then operates the console for selecting at least one terminal (destination terminal) to which the image is to be transmitted from the list of displayed terminals. Scanner 10a reads out the image and transmits the read image to the terminal(s) selected by the user.

Here, the list of terminals that fulfill the terms of having an association with certain verification data and are connected to the network is displayed on the scanner display. The user selects the destination terminal from the displayed terminals. According to the prior art, in cases where there is a large number of terminals connected to the network, the number of terminals displayed on the scanner display becomes large. The display of a large number of terminals is troublesome for the user in selecting the destination terminal.

On the other hand, according to the technology of this embodiment, when the user inputs authentication data to scanner 10a, only terminals that had transmit verification data which matches the input authentication data are displayed on display 16. That is, the number of displayed terminals is limited to be much less than the number of all terminals connected to the network 92. Since the number of terminals displayed is limited, the user is able to easily select (designate) the destination terminal.

Terminal 90a stores a communication program 91. The communication program 91 describes processes for transmitting the verification data to scanner 10a and processes for receiving an image data from scanner 10a. Terminal 90a transmits verification data to scanner 10a and receives the image data from scanner 10a by executing the communication program 91. Although not illustrated, the communication program 91 is also stored in the other terminals 90b and 90c.

The configuration of scanner 10a will be described next. Scanner 10a comprises a CPU 12, a communication unit 14, a display 16, a console 18, a reader unit 20, and a storage 22.

The communication unit 14 is a unit for communicating with terminal 90a or the like via the network 92. The main function of communication unit 14 is a function for receiving verification data from terminals and a function for transmitting a read document to the terminal. One verification data is received from one terminal at a time, however, it can be said that the communication unit 14 is configured to receive a plurality of verification data from one or more terminals.

The console 18 is an operating panel that the user inputs variety of commands or data directly to the scanner 10a. Console 18 accepts authentication data input by the user and accepts a selection (designation) of a destination terminal from the list of terminals displayed on display 16. The reader unit 20 is the core unit of the scanner 10a. The reader unit 20 reads out an image from a document that is set in place by the user.

The storage 22 stores various programs for execution by the CPU 12 and a job list 40. The job list 40 associates the terminals which had transmitted the verification data with the verification data received therefrom. Since a plurality of verification data from one or more terminals may be received by the communication unit 14, the job list 40 may include association of the same verification data with different terminals. Furthermore, the job list 40 may also include association of different verification data with a single terminal. Scanner 10a and the terminals perform TCP/IP-based communications and therefore the terminals which had transmitted the verification data can be specified by the IP addresses contained in the communicating data. The IP addresses are identification data for discriminating the terminals which have transmitted the verification data. Therefore, in other words, scanner 10*a* receives identification data for discriminating each terminal as well as verification data from the terminals. The identification data and verification data are then stored in the storage 22 in association with each other. In other words, the scanner 10*a* registers the received verification data associated with the identification data that had been received along therewith in the job list 40. Furthermore, the terminals may have terminal names assigned thereto ('PC-1' and so forth in this embodiment) in addition to IP addresses. Thus, the terminal names may also be associated with the verification data in the job list 40.

The functions of the programs stored in storage 22 will be described. 'PGM' in FIG. 1 is an abbreviation for 'program'. A communication program 30 is a program describing processes for controlling the communication unit 14. A verification program 32 is a program describing processes for specifying (extracting) verification data from the job list 40 that matches the authentication data input by the user. A list of terminals associated with the verification data matching the input authentication data is displayed on the display 16 by the verification program 32.

The reader control program 34 is a program that describes processes for reading an image from the document set by the user and for transmitting the read image to the destination terminal selected by the user. A console control program 36 is a program describing processes for accepting authentication data input by the user and instruction to select the image destination terminal.

Figure 2:
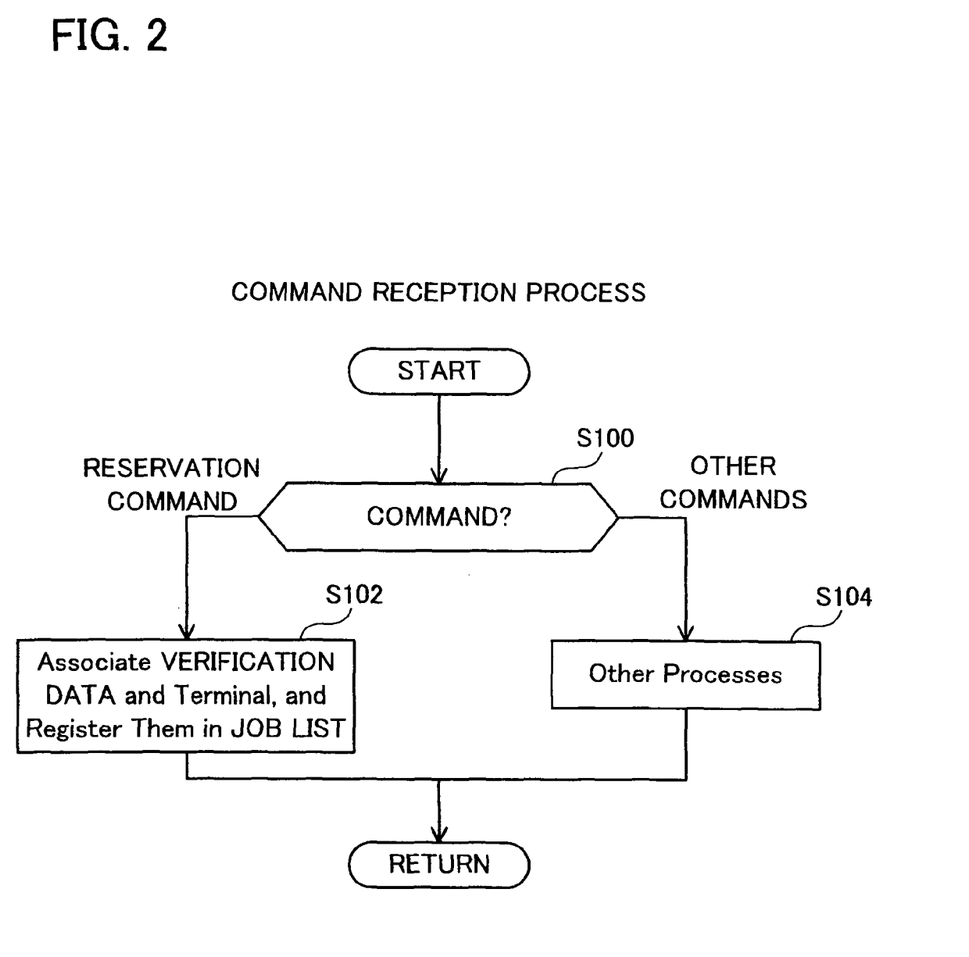
FIG. 2 shows a flowchart of command receiving process carried out by the image reading device.

The processes executed by scanner 10*a* will be described next. FIG. 2 is a flowchart of processes carried out when scanner 10*a* receives various commands from terminal 90*a* or the like. Upon receipt of a command, scanner 10*a* analyzes the received command and executes processes corresponding with the received command (step S100). In cases where the received command is the abovementioned reservation command, scanner 10*a* registers verification data received together with the reservation command in the job list 40 (step S102). In cases where the received command is not a reservation command, processes which corresponds with the received command are respectively executed (step S104).

Figure 3:
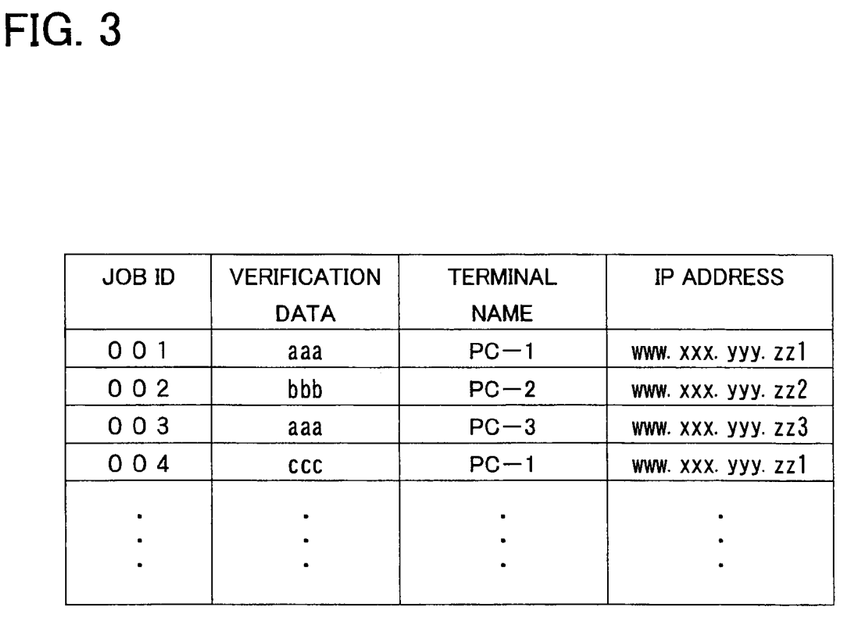
FIG. 3 shows an example of a job list.

In step S102, the IP address and the name of the terminal that had transmitted the verification data are registered in job list 40 in association with the received verification data. It should be noted that other identification data that is able to identify which terminal had sent the verification data may be associated with the received verification data. A set of a verification data registered in the job list 40 and the IP address and terminal name associated with the verification data may hereinafter be called a 'job'. An example of job list 40 is shown in FIG. 3. The job list 40 shown in FIG. 3 has four jobs with job IDs ranging from '001' to '004' registered therein. Job '001' indicates that verification data 'aaa' is transmitted from terminal PC-1 which has the IP address 'www.xxx.yyy.zz1' (terminal 90*a* in FIG. 1). Job '002' indicates that the verification data 'bbb' is transmitted from terminal PC-2 which has the IP address 'www.xxx.yyy.zz2' (terminal 90*b* in FIG. 1). Job '003' indicates that the verification data 'aaa' is transmitted from terminal PC-3 which has the IP address 'www.xxx.yyy.zz3' (terminal 90*c* in FIG. 1). Job '004' indicates that verification data 'ccc' is transmitted from terminal PC-1 which has the IP address 'www.xxx.yyy.zz1'. The verification data may be determined arbitrarily by the user, and there is therefore sometimes duplication between verification data. In the example of FIG. 3, there is duplication between jobs '001' and '003' having the same verification data 'aaa'.

Figure 4:
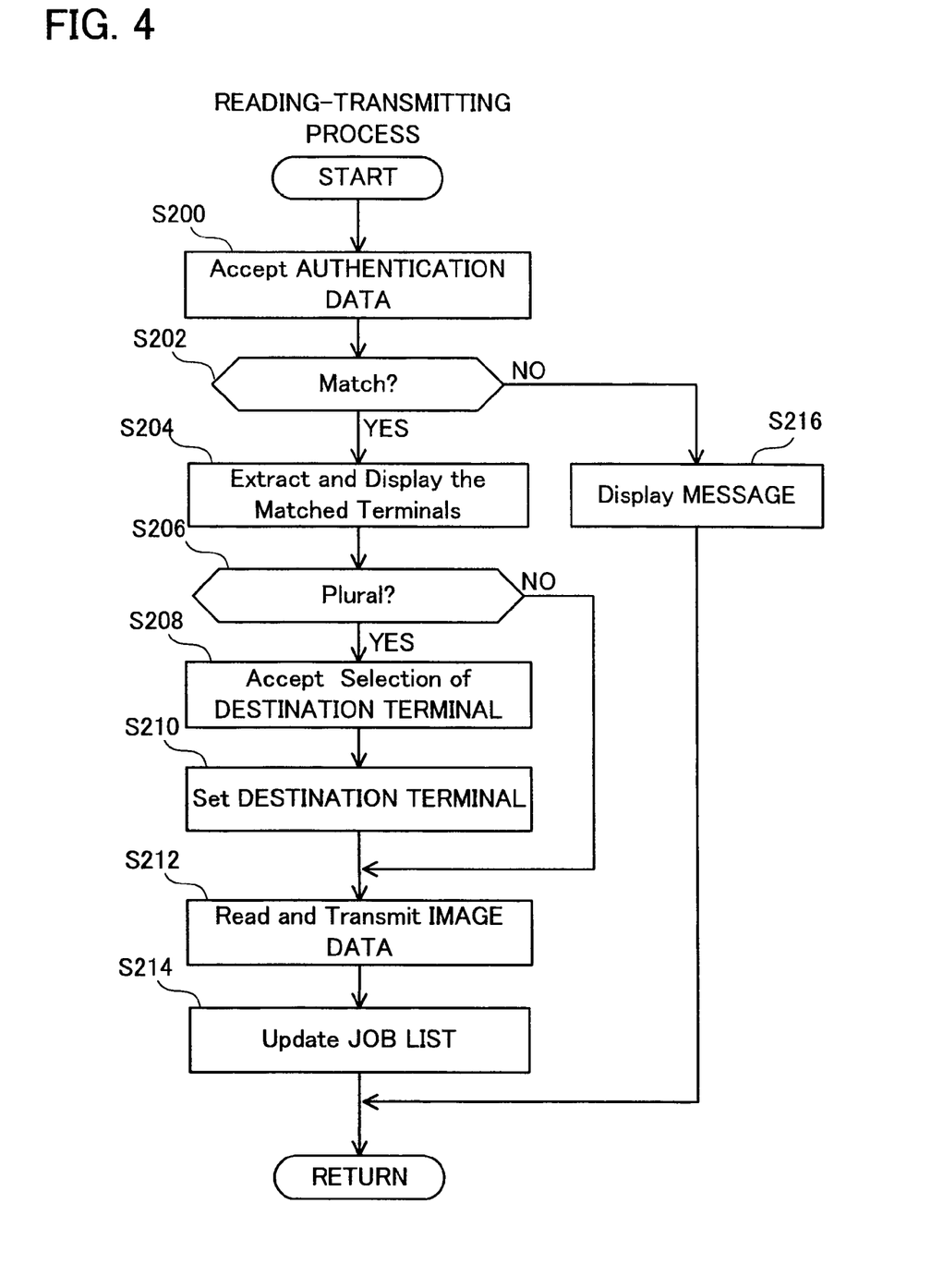
FIG. 4 shows a flowchart of image reading process.

FIG. 4 is a flowchart of image reading-transmitting process. The user, who had transmitted the reservation command and verification data from the terminal beforehand, now sets a document in place in scanner 10*a*. The user then inputs authentication data by operating console 18. Scanner 10*a* accepts the authentication data that is input by the user by means of the console control program 36 (step S200).

Thereafter, in step S202, the scanner 10*a* searches in the job list 40 the verification data that matches the acquired authentication data. When matching verification data is found (step S202: YES), a list of the terminals which are associated with the searched verification data is displayed (step S204). In other words, the steps S202 and S204 are processes in order to specify (extract) the one or more terminals, from the job list 40, that are associated with verification data that matches the authentication data and display a list of the specified (extracted) terminals. These processes are described in the verification program 32. In cases where the verification data which matches the authentication data cannot be found (step S202: NO), a message notifying the user as such is displayed on the display 16 (step S216), and the process is terminated.

Figure 5:
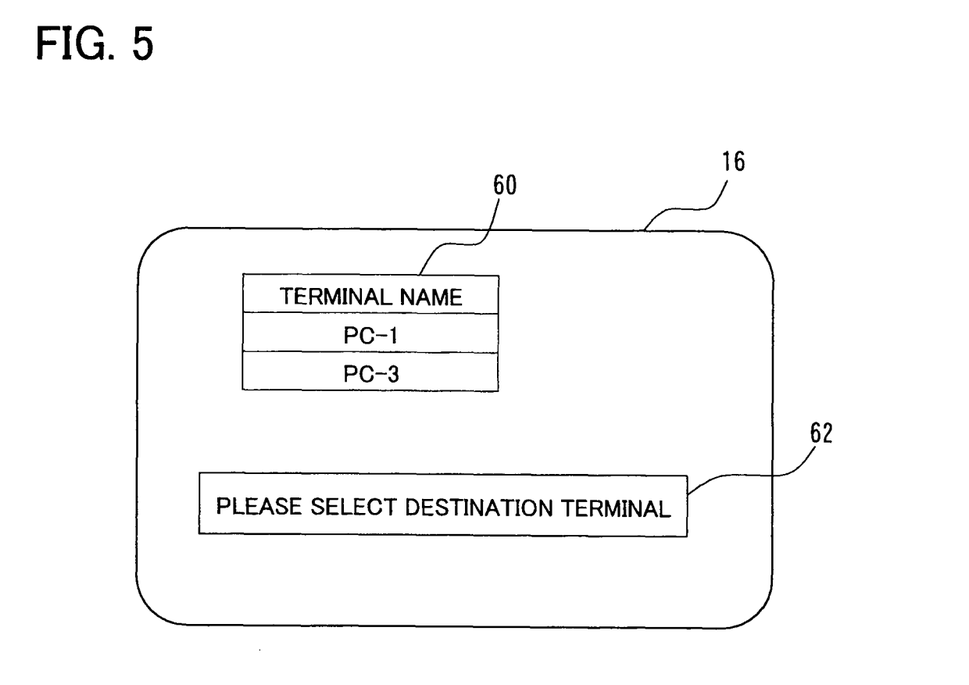
FIG. 5 shows an example of a display of a list of terminals.

Now, assume that the authentication data input by the user is 'aaa'. With the employment of the aforestated processes, the verification program 32 searches the job list 40 shown in FIG. 3 and extracts jobs '001' and '003' in which the verification data in match with the authentication data 'aaa' is registered. The verification program 32 displays 'PC-1' which is the terminal registered in job '001', and 'PC-3' which is registered in job '003' on display 16. An example of the display is shown in FIG. 5. The display 16 displays a list 60 of the terminal names of the extracted terminals. The display 16 also displays a message 62 requesting the user to select the destination terminal from the list 60. The message 62 is displayed in cases where there is a plurality of terminals extracted in step S202 (step S206: YES). In a case where there is only one terminal extracted in step S202 (step S206: NO), message 62 is not displayed and the extracted terminal is automatically set as the destination terminal (step S210).

In a case where there is a plurality of terminals extracted in step S202 (step S206: YES), scanner 10*a* awaits the selection of the destination terminal to be performed by the user.

The user selects the destination terminal from the list of terminals by operating the console 18 once again. Upon acceptance of the selection of the destination terminal from the user (step S208), the selected terminal is set as the destination terminal (step S210). The processes of steps S202, S204, S206, S208, and S210 are described in verification program 32.

When the setting of the destination terminal ends, the reader unit 20 of scanner 10*a* starts image reading. Then the scanner 10*a* transmits the read image to the destination terminal that was set in step S210 (step S212). The process of step S212 is described in the reading control program 34.

The reading-transmitting process is finally completed by deleting the job, from the job list 40, in which the registered terminal name is selected by the user (step S214).

The scanner 10*a* first accepts verification data from the terminal. When the user sets a document in place in the scanner 10*a* and inputs authentication data, the scanner 10*a* displays a list of only those terminals that had transmitted the verification data which matches the authentication data input by the user. The user may select the desired terminal from the displayed list. The number of terminals displayed is limited by the authentication data and verification data. Since the number of terminals displayed is far smaller than the number of terminals connected to the network, the user is able to easily and reliably select the destination terminal.

Furthermore, in a case where there is only one terminal has been found in step S202, the scanner 10a automatically sets the found terminal as the destination terminal (step S206: N0 and S210). In this case, the user's operation for selecting the destination terminal is unnecessary.

Though a scanner was employed above as the example of the image reading device of this embodiment, it may also be a multi functioned device that combines a printer function and a copy function or the like. Furthermore, a personal computer was employed above as the example of a terminal, it may be of any apparatus that is able to send verification data and receive image data from the image reading device via a network.

Some of the preferred technical features of the image reading device of the embodiment above will be described. In a case where the verifying module (verification program 32) extracts (specifies) only one terminal that corresponds to the verification data that matches with the authentication data, the verifying module may select the only one extracted (specified) terminal as the destination terminal without selection by the user through the console 18. In a case where there is one extracted terminal, the extracted terminal is no different from the destination terminal desired by the user. In this case, the image reading device does not await the selection of the destination terminal by the user, and may automatically select the extracted terminal as the destination terminal. Thus, the work by the user to select the transmission destination terminal can be omitted.

The technical features disclosed by this specification can also be implemented as an image reading-transmitting method for transmitting a read image to a terminal via a network. The method includes the following steps:
(1) a reception step of receiving verification data from a terminal via the network;
(2) an associating step of associating the received verification data with the terminal that had transmitted the verification data;
(3) a storage step of storing the received verification data;
(4) a first acceptance step of accepting authentication data input by a user through an operation unit provided in the image reading device;
(5) a verification step of specifying one or more terminals associated with the stored verification data that matches the input authentication data;
(6) a displaying step of displaying a list of the one or more specified terminals;
(7) a second acceptance step of accepting selection of at least one specified terminal to which the read image is to be transmitted, the selection being input by the user through the operation unit provided in the image reading device;
(8) a reading step of reading an image; and
(9) a transmission step of transmitting the image read by the reading step to the selected terminal.

The verification step may be referred to as the specifying step. If only one terminal has been specified at the verification step (the specifying step), the method may includes a selecting step of selecting the only one specified terminal as the selected terminal without accepting the selection being input by the user at the second acceptance step. The reading step (8) may be executed any time before execution of the transmission step (9). For example, the reading step may be executed before the reception step (1).

The technical features disclosed by this application may also be implemented as a program for causing a computer of the image reading device that transmits the image read from the document via a network to a terminal to execute the above steps. The technical features disclosed by this application may also be constituted as an image reading system which comprises the above image reading device and terminal.

A specific example of the present invention was described in detail hereinabove, however, is merely an illustration that does not limit the scope of the claims. The technology appearing in the claims includes technologies which result from making a variety of modifications and changes to the specific example illustrated hereinabove. The technological elements illustrated in this specification or in the drawings exhibit technical utility singly or in a variety of combinations; however, the present invention is not limited to the combination which appears in the claims that are originally attached at the time of filing the present application. Moreover, the technology illustrated in this specification and/or the drawings achieves a plurality of objectives at the same time, and the act of achieving one of these objectives by itself possesses a technical utility.

What is claimed is:

1. An image reading device comprising:
a reader unit configured to read an image on a document;
a communication unit configured to be connected with a network;
a data storage;
an operating unit;
a display;
a processing unit; and
memory having instructions stored thereon that, when executed by the processing unit, cause the image reading device to:
receive first verification data and a first IP address of a first terminal from the first terminal, which is one of a plurality of terminals connected to the network, via the communication unit and the network, in a state where each of the image reading device and the first terminal is establishing a connection with the network, the state of establishing the connection with the network being a state in which the image reading device and the first terminal are capable of communicating via the network, the first verification data being a first character string which is inputted by a first user in the first terminal, before the first verification data is sent from the first terminal to the image reading device, in the state where each of the image reading device and the first terminal is establishing the connection with the network;
receive second verification data and a second IP address of a second terminal from the second terminal, which is another one of the plurality of terminals connected to the network, via the communication unit and the network, in a state where each of the image reading device and the second terminal is establishing a connection with the network, the state of establishing the connection with the network being a state in which the image reading device and the second terminal are capable of communicating via the network, the second verification data being a second character string which is inputted by a second user in the second terminal, before the second verification data is sent from the second terminal to the image reading device, in the state where each of the image reading device and the second terminal is establishing a connection with the network;
store the first verification data and the second verification data in the data storage, wherein the first verification data is stored in the data storage and is associated with the first IP address of the first terminal and a first terminal name of the first terminal, and wherein the second verification data is stored in the data storage and is associated with the second IP address of the second terminal and a second terminal name of the second terminal;

allow a user to input authentication data, which is a character string, through the operating unit after storing the first verification data and the second verification data in the data storage;

determine whether the authentication data inputted through the operating unit matches the first verification data stored in the data storage;

when determined that the inputted authentication data matches the first verification data, determine whether the inputted authentication data also matches the second verification data stored in the data storage;

specify the first terminal name, which is associated with the first verification data stored in the data storage, when determined that the inputted authentication data matches the first verification data;

specify the second terminal name, which is associated with the second verification data stored in the data storage, when determined that the inputted authentication data matches the second verification data;

generate a list including the first terminal name and the second terminal name once the first terminal name and the second terminal name are specified;

display the list including the first terminal name and the second terminal name in the display;

allow the first user or the second user to designate one terminal name from the first terminal name and the second terminal name in the displayed list;

determine one of the first terminal and the second terminal in accordance with the designated one terminal name;

determine the first terminal when determining that the inputted authentication data matches the first verification data and the inputted authentication data does not match the second verification data, without generating and displaying a list including the first terminal name and not including the second terminal name;

transmit the read image to the determined one of the first terminal and the second terminal via the communication unit and the network; and delete one of the first verification data and the second verification data stored in the data storage after transmitting the read image to the determined one of the first terminal and the second terminal, wherein the deleted one of the first verification data and the second verification data corresponds to the determined one of the first terminal and the second terminal.

2. In an image reading device comprising a reader unit configured to read an image from a document; a communication unit configure to be connected with a network; a data storage; an operating unit; and a display, a computer-implemented method including:

reading an image on a document;

receiving first verification data and a first IP address of a first terminal from the first terminal, which is one of a plurality of terminals connected to the network, via the communication unit and the network, in a state where each of the image reading device and the first terminal is establishing a connection with the network, the state of establishing the connection with the network being a state in which the image reading device and the first terminal are capable of communicating via the network, the first verification data being a first character string which is inputted by a first user in the first terminal, before the first verification data is sent from the first terminal to the image reading device, in the state where each of the image reading device and the first terminal is establishing the connection with the network;

receiving second verification data and a second IP address of a second terminal from the second terminal, which is another one of the plurality of terminals connected to the network, via the communication unit and the network, in a state where each of the image reading device and the second terminal is establishing a connection with the network, the state of establishing the connection with the network being a state in which the image reading device and the second terminal are capable of communicating via the network, the second verification data being a second character string which is inputted by a second user in the second terminal, before the second verification data is sent from the second terminal to the image reading device, in the state where each of the image reading device and the second terminal is establishing a connection with the network;

storing the first verification data and the second verification data in the data storage, wherein the first verification data is stored in the data storage and is associated with the first IP address of the first terminal and a first terminal name of the first terminal, and wherein the second verification data is stored in the data storage and is associated with the second IP address of the second terminal and a second terminal name of the second terminal;

allowing a user to input authentication data, which is a character string, through the operating unit after storing the first verification data and the second verification data in the data storage;

determining whether the authentication data inputted through the operating unit matches the first verification data stored in the data storage;

determining whether the inputted authentication data also matches the second verification data stored in the data storage when determined that the inputted authentication data matches the first verification data;

specifying the first terminal name, which is associated with the first verification data stored in the data storage, when determined that the inputted authentication data matches the first verification data;

specifying the second terminal name, which is associated with the second verification data stored in the data storage, when determined that the inputted authentication data matches the second verification data;

generating a list including the first terminal name and the second terminal name once the first terminal name and the second terminal name are specified;

displaying the list including the first terminal name and the second terminal name in the display;

allowing the first user or the second user to designate one terminal name from the first terminal name and the second terminal name in the displayed list;

determining one of the first terminal and the second terminal in accordance with the designated one terminal name;

determining the first terminal when determining that the inputted authentication data matches the first verification data and the inputted authentication data does not match the second verification data, without generating and displaying a list including the first terminal name and not including the second terminal name;

transmitting the read image to the determined one of the first terminal and the second terminal via the communication unit and the network; and deleting one of the first verification data and the second verification data stored in the data storage after transmitting the read image to the determined one of the first terminal and the second terminal, wherein the deleted one of the first verification data and the second verification data corresponds to the determined one of the first terminal and the second terminal.

3. A system comprising:

a first terminal connected to a network;

a second terminal connected to the network, the second terminal being different from the first terminal; and an image reading device connected to the network, the image reading device being different from the first terminal and the second terminal, wherein the first terminal comprises:
  a first operating unit configured to allow a first user to input first verification data, a first command and a first designation to designate the image reading device; and
  a first communication unit configured to transmit the first verification data to the image reading device as the first designation in response to the first command inputted by the first user, wherein the second terminal comprises:
  a second operating unit configured to allow a second user to input second verification data, a second command and a second designation to designate the image reading device; and
  a second communication unit configured to transmit the second verification data to the image reading device as the second designation in response to the second command inputted by the second user, and wherein the image reading device comprises:
  a reader unit configured to read an image on a document;
  a communication unit configured to be connected with the network;
  a data storage;
  an operating unit;
  a display;
  a processing unit; and
  memory having instructions stored thereon that, when executed by the processing unit, cause the image reading device to:
    receive the first verification data and a first IP address of the first terminal from the first terminal via the communication unit and the network, in a state where each of the image reading device and the first terminal is establishing a connection with the network, the state of establishing the connection with the network being a state in which the image reading device and the first terminal are capable of communicating via the network, the first verification data being a first character string which is inputted by a first user in the first terminal, before the first verification data is sent from the first terminal to the image reading device, in the state where each of the image reading device and the first terminal is establishing the connection with the network;
    receive the second verification data and a second IP address of the second terminal from the second terminal via the communication unit and the network, in a state where each of the image reading device and the second terminal is establishing a connection with the network, the state of establishing the connection with the network being a state in which the image reading device and the second terminal are capable of communicating via the network, the second verification data being a second character string which is inputted by a second user in the second terminal, before the second verification data is sent from the second terminal to the image reading device, in the state where each of the image reading device and the second terminal is establishing a connection with the network;
    store the first verification data and the second verification data in the data storage, wherein the first verification data is stored in the data storage and is associated with the first IP address of the first terminal and a first terminal name of the first terminal, and wherein the second verification data is stored in the data storage and is associated with the second IP address of the second terminal and a second terminal name of the second terminal;
    allow a user to input authentication data, which is a character string, through the operating unit after storing the first verification data and the second verification data in the data storage;
    determine whether the authentication data inputted through the operating unit matches the first verification data stored in the data storage;
    when determined that the inputted authentication data matches the first verification data, determine whether the inputted authentication data also matches the second verification data stored in the data storage;
    specify the first terminal name, which is associated with the first verification data stored in the data storage, when determined that the inputted authentication data matches the first verification data;
    specify the second terminal name, which is associated with the second verification data stored in the data storage, when determined that the inputted authentication data matches the second verification data;
    generate a list including the first terminal name and the second terminal name once the first terminal name and the second terminal name are specified;
    display the list including the first terminal name and the second terminal name in the display;
    allow the first user or the second user to designate one terminal name from the first terminal name and the second terminal name in the displayed list;
    determine one of the first terminal and the second terminal in accordance with the designated one terminal name;
    determine the first terminal when determining that the inputted authentication data matches the first verification data and the inputted authentication data does not match the second verification data, without generating and displaying a list including the first terminal name and not including the second terminal name;
    transmit the read image to the determined one of the first terminal and the second terminal via the communication unit and the network; and
    delete one of the first verification data and the second verification data stored in the data storage after transmitting the read image to the determined one of the first terminal and the second terminal, wherein the deleted one of the first verification data and the second verification data corresponds to the determined one of the first terminal and the second terminal.

* * * * *